T. H. KENNEDY & F. J. HECKEL.
PROCESS OF SEPARATING THE PRODUCTS OF THE DESTRUCTIVE DISTILLATION OF WOOD.
APPLICATION FILED JAN. 6, 1910.
969,635.
Patented Sept. 6, 1910.
2 SHEETS—SHEET 1.
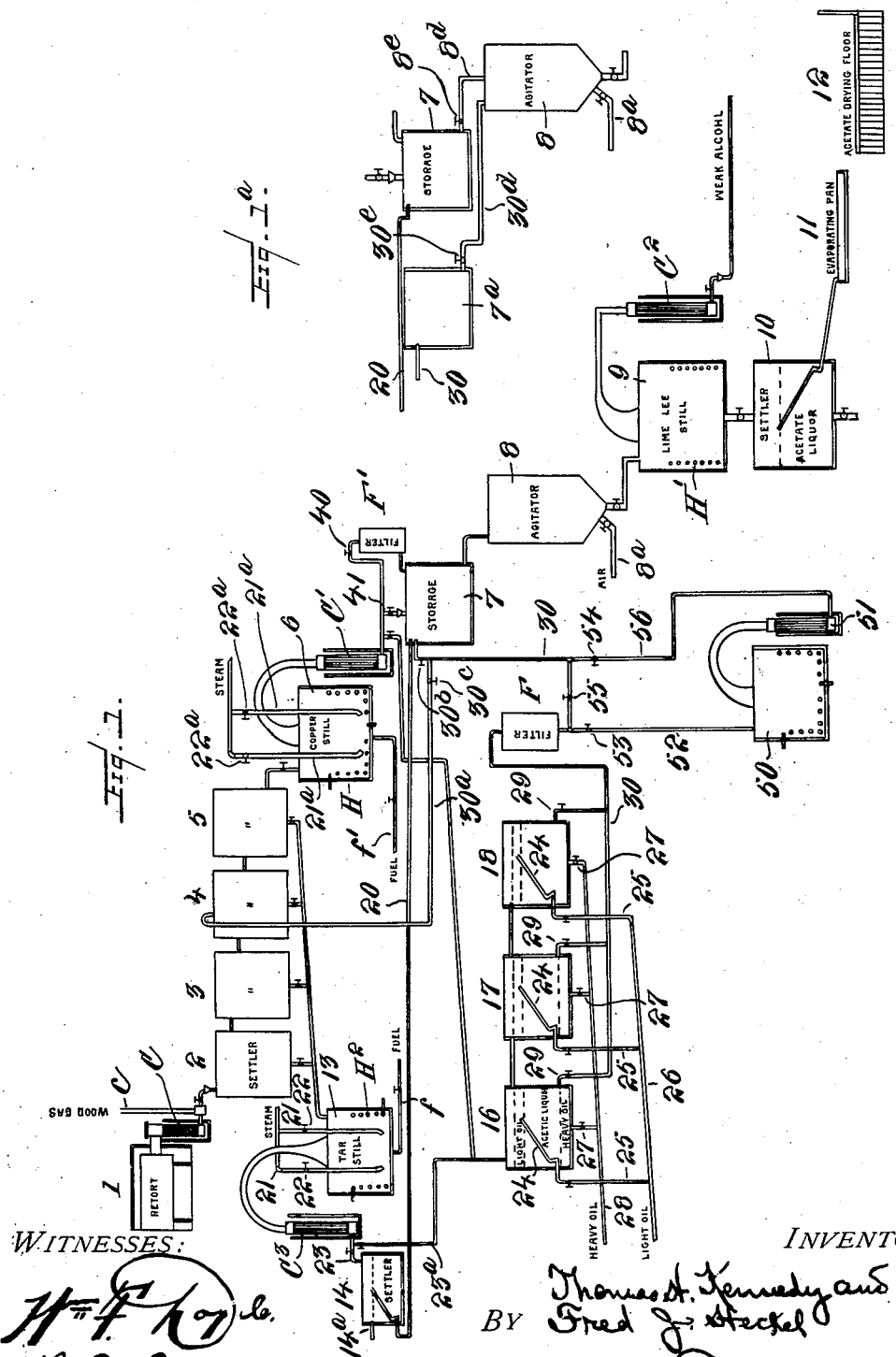

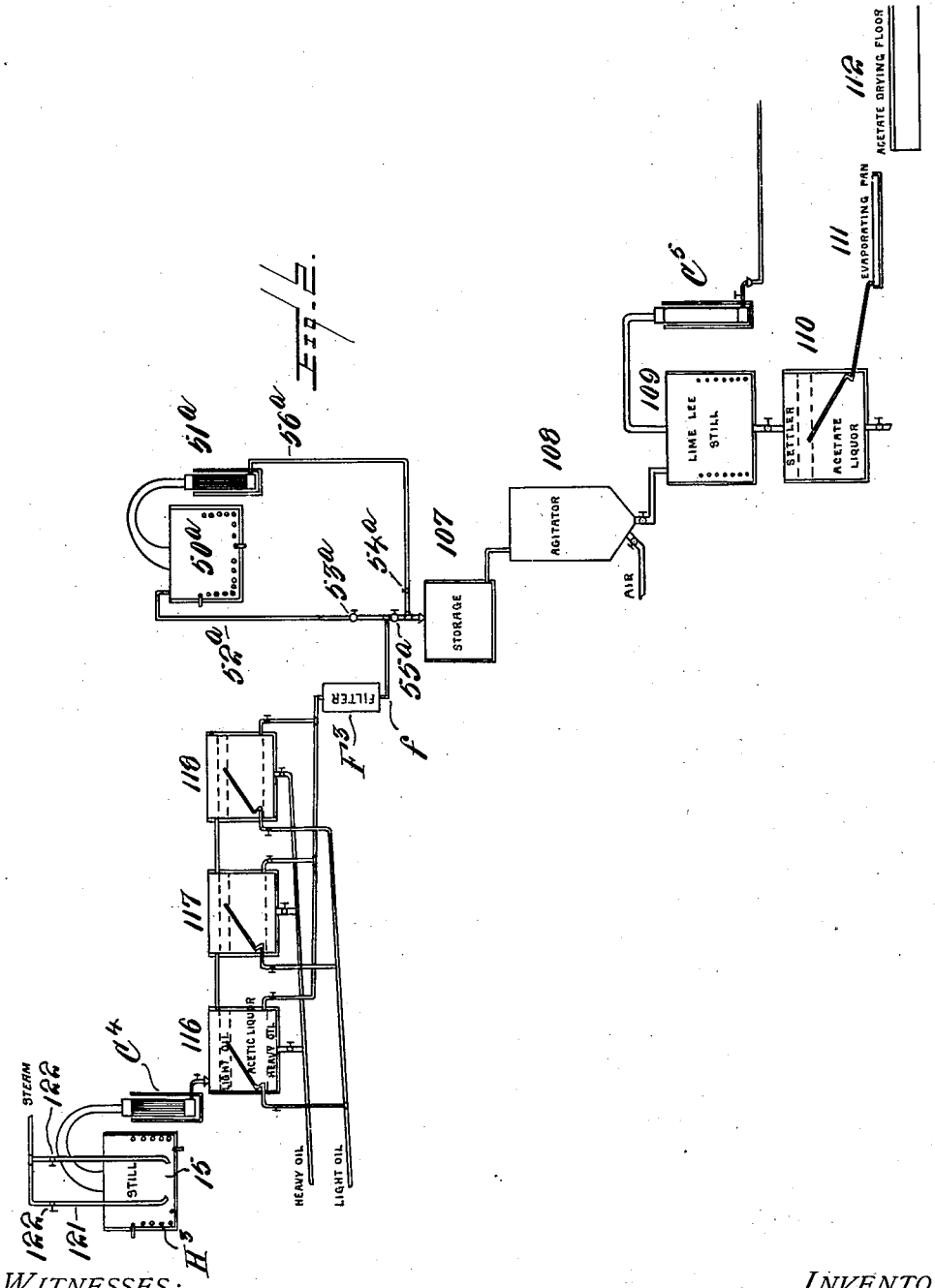

UNITED STATES PATENT OFFICE.

THOMAS H. KENNEDY AND FRED J. HECKEL, OF BRADFORD, PENNSYLVANIA; SAID HECKEL ASSIGNOR TO SAID KENNEDY.

PROCESS OF SEPARATING THE PRODUCTS OF THE DESTRUCTIVE DISTILLATION OF WOOD.

969,635.     Specification of Letters Patent.     Patented Sept. 6, 1910.

Application filed January 6, 1910. Serial No. 536,631.

*To all whom it may concern:*

Be it known that we, THOMAS H. KENNEDY and FRED J. HECKEL, citizens of the United States, residing at Bradford, in the county of McKean and State of Pennsylvania, have invented certain new and useful Improvements in Processes of Separating the Products of the Destructive Distillation of Wood; and we do hereby declare the following to be a full, clear, and exact description of the invention, such as will enable others skilled in the art to which it appertains to make and use the same.

Our invention relates to an improved process for separating the products of the destructive distillation of wood, such as hard wood, or the wood from the deciduous trees, the woods most generally treated being beech, birch and maple. In the present process in general use commercially for this purpose, the main products obtained are wood alcohol and acetic acid in the form of "gray" acetate of lime, of about 80% purity. As by products tar and oils are also obtained. Charcoal is of course obtained from the retorts. In separating the products of the destructive distillation of such wood, as at present practiced, we have discovered that considerable amounts of acetic acid, in the vapors coming from the retort, are lost or in other words are not recovered as such in the process, but pass off in and with the tars and oils.

Our invention, therefore, consists in a process for separating the products of the destructive distillation of such woods, whereby this additional amount of acetic acid is recovered, and in practice we find that by the use of our process we are able to increase the amount of acetate of lime recovered, by about fifteen per cent. for any given quantity of wood treated.

The novel features of our invention are fully set forth in the accompanying specification, reference being had to the accompanying drawings, and said invention is fully disclosed in the following description and claims.

Referring to the said drawings, Figure 1 represents a diagrammatic view of one form of apparatus for carrying our improved process into effect. Fig. 1ª is a detail of a part of Fig. 1 showing a slight modification of the arrangement of the parts. Fig. 2 is a diagrammatic view of a modified form of apparatus for the same purpose.

In the drawings, 1 represents a retort, or oven, in which the wood under treatment is placed, in any suitable manner, and subjected to destructive heat, in any usual or preferred way, so as to destructively distill it. While the woods generally treated are birch, beech and maple, as before stated, other woods of the deciduous trees may be employed with advantageous results. The vapors pass from the retort 1, into a condenser C, of any usual or preferred construction from which the condensed retort liquor passes into settling tanks 2, 3, 4 and 5 of which there may be any desired number, a pipe *c* being provided for the escape of the non-condensable wood gas, between the condenser and settling tanks. In these settling tanks the raw tars and oils separate from the pyroligneous acid liquor, the latter, containing some tarry matters, being drawn off into one or more stills (generally of copper) one of which is indicated at 6. This still is heated preferably by means of a steam coil H, as shown, and is run continuously for a considerable period at a time, as a week, the fresh pyroligneous acid liquor being admitted from the settling tanks from time to time. The distillate from the copper still 6 which contains acetic acid and alcohol, passes to a condenser C' and from said condenser it is drawn off into a storage tank 7 (or tanks). The filter F' shown in Fig. 1, the use of which is hereinafter described, is at this time ordinarily cut off from the pipe leading from the condenser, by a suitable valve indicated at 40 in Fig. 1. The tarry matters collect and remain in the still.

The distillate from the copper still is mixed with an alkali, preferably lime, agitated and distilled. In the use of the apparatus shown in the drawing the distillate is drawn from the storage tank 7 into a receptacle 8, and is mixed with an alkali (preferably lime in the form of slaked lime, or milk of lime) and agitated in any suitable way, by means of a stirring device, or by the injection of compressed air, through a pipe indicated at 8ª. The acetic acid present unites with the lime forming acetate of lime. The resulting mixture is then passed into what we term the "lime lee still" 9, where it is again distilled by means of heat applied preferably from a steam coil H', as shown. The vapors from the lime lee still pass into a condenser C² where they are condensed as weak alcohol which is conducted away, and preferably redistilled to produce commercial wood alcohol of from 80 to 84 per cent.

The residue from the lime lee still 9 is discharged into a settling tank 10 where the solution of acetate of lime is separated from the solid matter, and impurities (which in the form of sludge is subsequently discharged as waste) and is then drawn off into an evaporating pan 11, of any suitable form, and heated by steam coils (not shown), or by waste heat from the retort, or direct heat, as preferred, and the solution is evaporated to dryness, and is then discharged upon a drying floor 12, as gray acetate of lime, of substantially 80 per cent. purity.

Returning now to the first settling tanks 2, 3, 4 and 5, it will be noted that as the crude pyroligneous acid liquor is drawn off to the copper still there is an accumulation in said tanks of raw tar and oils, and these are drawn off at suitable intervals, by means of pipes, and transferred to a tar still 13, which is provided with heating means, such as a steam coil H². The raw tar and oil is here distilled, the distillate passing to a condenser C³, and thence to a settling tank 14, where the oil is drawn off through a pipe 14ª and the pyroligneous acid liquor is conducted by a pipe 20, and is introduced into the apparatus for carrying out the main process at any point in advance of the receptacle in which the admixture of lime takes place. In this instance the pipe 20 is shown as leading to the storage tank 7 in Fig. 1.

Prior to our invention, it has been customary to draw off the tarry residue from the tar still 13, and the tarry residue from the copper still 6, to a fuel tank, from which it was used as fuel, or for other purposes. In carrying out our process, however, we proceed to a further treatment of the tarry residue in the tar still and in the copper still as hereinafter fully set forth.

The tarry residue in the tar still 13, is subjected to the action of water, heat sufficient for the distillation of the water and agitation, and this is accomplished preferably by injecting into the bottom of the mass live steam or superheated steam, and causing it to bubble through the mass. The steam is advantageously injected by means of a pipe or pipes 21, controlled by suitable cocks 22, and connected with a steam supply. The steam agitates the tarry residue very thoroughly and the water condensed therefrom unites with the acetic acid present in the tar, by reason of the affinity of acetic acid for water, and the heat of the steam, which may be relied upon alone, or may be supplemented by the heat applied to the still by means of the coil H² or by external heat, causes acid water, and volatile oils not previously removed in the distillation of the tar, to pass over from the still into the condenser C³. We have found in practice that the treatment of the tarry residue by the action of water, heat and agitation and preferably by the introduction of live steam, tends to break up the tar, to bring the water into an intimate relation with the particles thereof, and thus to extract therefrom considerable quantities of acetic acid, and a considerable quantity of oils which are not and cannot be extracted by the ordinary distillation of the raw tars. Where live steam is used, should the condensation of the steam not provide sufficient quantities of water additional quantities of water are added when desired to facilitate the extraction of the acetic acid and oils.

In some cases, instead of using live steam we may employ hot water, to take up the acetic acid, which may be introduced in any desired manner, as for example, by means of the pipes 21 and compressed air, introduced through the pipes 21 at the bottom of the tarry mass for the purpose of agitating it, and bringing the water into intimate relation with the particles thereof, the heat necessary for the vaporization of the acid water being supplied by the steam coil H² or other heating means. Or in some cases we may employ any well known mechanical means to produce agitation of the mass, in conjunction with the introduction of water and the application of heat for vaporizing the same. In any case we prefer to continue the treatment until an amount of watery distillate is passed from the still considerably in excess of the contents of the still and until practically no more acid is passed over, and this distillate is preferably collected in separate settling tanks 16, 17 and 18. Pipes 23 and 23ª lead from the condenser to the tank 14, and to the tanks 16, 17 and 18 respectively, and are controlled by valves, so that the distillate from the operation now being described can be shut off from the tank 14 and led to the settling tanks 16, 17 and 18 as described. In these settling tanks the distillate is allowed to stand for a considerable length of time, substantially twenty four hours being required to effect a thorough separation between the solution of acetic acid, and the oily matter which in about the time mentioned, will separate into a layer of heavy oil below the acid liquid, and a layer of light oil above the same. The light oil will be drawn off from each tank by means of a suitable swing pipe 24 or other suitable means, and connecting pipes 25, to a pipe 26. The heavy oils will be drawn off, as through pipes 27 at the bottom of the tanks, to a pipe 28. The acid liquor is drawn off separately free from oil, as through pipe 29, and if desired or found necessary it may be passed through a filter, indicated at F and into a pipe 30, which conducts it to any desired point in the apparatus for carrying out the main process, in advance of the receptacle in which the lime is added. In the present instance the pipe 30 leads to the storage tank 7, and a branch pipe 30$^a$ therefrom is shown which leads to one of the primary settling tanks (tank 4) suitable valves 30$^b$, 30$^c$ being provided to control said pipes. When the liquid is conducted by pipe 30 to the storage tank 7 (in which case valve 30$^b$ is open and valve 30$^c$ is closed), it is treated with the distillate from the copper still as previously described to separate the alcohol and the acetic acid (as gray acetate of lime). The tarry residue remaining in the tar still is then run off to any suitable receptacle to be used as fuel or for other purposes, by means of the pipe $f$.

It has been found in practice that the acetic liquor obtained from the tars as just described, contains a certain amount of coloring and foreign matters, (the color of which tends to deepen as the liquid stands) and that this coloring and foreign matter injuriously affects the color and quality of the acetate of lime obtained therefrom. The acetate produced from the distillate from the copper still is slightly above the commercial requirements of gray acetate of lime and the said acetic liquor obtained from the tars can be introduced into the tank 7, as before described, without carrying the resulting acetate below commercial requirements if its percentage in the liquid introduced into the lime lee still is not too great. We prefer to employ a separate storage tank 7$^a$ (see Fig. 1$^a$) to receive the acetic liquor, where it is introduced at this point in the main process, said tank 7$^a$ being connected with the agitator 8 by pipe 30$^d$ having a controlling cock 30$^e$ while tank 7 is connected to the agitator 8 by a pipe 8$^d$ having a cock 8$^e$ for controlling the same. By this means proportionate quantities of liquor can be drawn from tanks 7 and 7$^a$ (say 85 per cent. from tank 7 to 15 per cent. from tank 7$^a$) in which proportions the color and quality of the resulting acetate is not injuriously affected by the presence of the coloring and foreign matter in the acetic liquor coming from pipe 30. It has also been found in practice, that if the acetic liquor obtained from the tars in the manner described, be subjected to another distillation before being mixed with the lime the coloring and foreign matter referred to is practically eliminated. This additional distillation may be accomplished separately, as by passing the acetic liquor from settling tanks 16, 17 and 18 through an additional still and condenser as indicated in Fig. 1, before it is conducted to tank 7. In said figure we have shown a still 50, and condenser 51, for this purpose, the still being connected to pipe 30 by a pipe 52 provided with a cock 53, and the condenser 51 being connected to pipe 30, by a pipe 56 having a cock 54 therein, a suitable cock 55 being provided in pipe 30, between the pipes 52 and 56. In this case the acetic liquor can be conducted directly to tank 7, or otherwise treated to produce acetate of good quality. Where it is not desired to employ a separate still for this purpose substantially the same results, of eliminating the coloring and foreign matter from the acetic liquor in the settling tanks 16, 17 and 18 can be obtained by introducing the liquor from pipe 30, into the apparatus for carrying out the main process so that it will pass through the main copper still 6. In Fig. 1 we have shown a branch pipe 30$^a$ connecting the pipe 30 with one of the primary storage tanks (in this instance tank 4) said pipe being provided with a cock 30$^c$ and the pipe 30 being provided with a cock 30$^b$ between pipe 30$^a$ and the storage tank 7. By opening cock 30$^c$ and closing cock 30$^b$ the liquor will pass from settling tanks 16, 17 and 18 to tank 4 and thence through the copper still 6, and be redistilled and admixed with the distillate from the pyroligneous liquor, and be carried on through the other steps of the process. In case the liquor is carried through pipe 30$^a$ the cocks 53 and 54 would be closed to cut off communication with still 50, or the still 50 omitted altogether.

There is also a considerable accumulation of tarry matter in the copper still 6, which as before stated is run for considerable periods continuously. When the tarry matters have accumulated to such an extent as to render it desirable to discharge the still the connection between the still 6 and the settling tanks 2, 3, 4 and 5 is closed, and the tarry residue is treated in the manner previously described by the action of water, heat and agitation, and preferably by the introduction of live steam at or near the bottom of the still as by means of pipes 21$^a$, 21$^a$ connected to a steam supply pipe and provided with suitable cocks 22$^a$, 22$^a$. The distillate from this tarry residue which contains a much smaller quantity of oily matters, but which contains water and acetic acid, is led preferably to the settling tanks 16, 17 and 18, where it is settled, after which the acetic acid liquid is led (through the filter F if desired) to the desired point in the apparatus for carrying on the main process, as heretofore described, and passes through the steps of the process for the separation of the alcohol, and the acetate of lime, therefrom with the main portions of the products.

In some cases where the amount of oil present is extremely small, the watery distillate from the tarry residue in the still 6, may be turned directly into the storage tank 7 or may be passed through a filter F', if preferred, to eliminate the small quantity of oil present, before passing to the tank 7. Suitable pipe connections provided with cocks 40 and 41 will preferably be provided to enable the operator to control the discharge from the condenser C' in either of the ways indicated.

After treatment as above described, the residue of tar is conducted from the still 6 by pipe f', to a fuel tank or other receptacle.

Actual demonstration has established that by our improved process, we obtain substantially 15 per cent. more acetate of lime from a given quantity of wood, than is produced by the processes now in general use, effecting a very considerable saving in the cost of production of the gray acetate and a corresponding increase in profit.

In Fig. 2 we have illustrated a form of apparatus for carrying out a sub-process of our main process. Where it is not desired to treat the tarry residues collecting in the tar still 13 and copper still 6, directly therein, as hereinbefore set forth, the tar residues may be run off to a storage tank, or directly to a separate still 15, which is provided with a heating coil $H^3$, and steam pipes 121, 121 controlled by cocks 122, 122 and connected to a suitable steam supply pipe, said pipes 121 extending to or near the bottom of the still. The action of the steam on the tarry residues will be precisely as previously described, and the vapors containing acid liquor mixed with oil pass through the condenser $C^4$ and thence to settling tanks 116, 117 and 118 where the liquid is allowed to stand for about twenty-four hours, as before described. The oils are then separated from the acid liquor, as before described and the acid liquor is led (through filter $F^3$ if desired) to storage tank 107. If it is desired to eliminate the coloring and foreign matter before referred to the liquor from tanks 116, 117 and 118 can be redistilled before passing to the tank 107. In Fig. 2 we have shown a still $50^a$ and condenser $51^a$ for this purpose, the still $50^a$ being connected by the pipe $52^a$ with the pipe $f$ from the filter $F^3$, said pipe being provided with a cock $53^a$, the condenser being connected by a pipe $56^a$ with the pipe $f$, which pipe 56 is provided with a cock $54^a$, a cock $55^a$ being provided in pipe $f$ between the pipes $52^a$ and $56^a$. From the tank 107, the acetic liquor is led to the lime mixing tank 108, where the lime is added, and the mass agitated. The resulting liquor is then drawn off into a lime lee still 109 and distilled, the purpose of this being to drive off some water and oils to improve the purity of the acetate of lime, the waste water and oils distilled off through condenser $C^5$ going to waste. If preferable the distillate from storage tank 107 is carried direct to the lime lee still 109, where the alkali is added and agitated by a stirring device in the still. The liquid left in the lime lee still and containing acetate of lime is drawn off into a settling tank 110 from which the clear liquid is drawn off to an evaporating pan 111, and evaporated to dryness, after which the acetate of lime is discharged onto a drying floor 112, and dried preparatory to shipment.

It is obvious that in the use of apparatus for carrying our process into effect, the transferring of the liquids from one receptacle to another, as before described, will be effected by gravity where this is practicable and where it is not, suitable forcing devices or pumps, or other preferred means which are not shown in the diagrammatic views of the drawings, will be employed where necessary or desirable.

What we claim and desire to secure by Letters Patent is;—

1. In a process for separating the products of the destructive distillation of wood, the sub-process which consists in subjecting the residual tar and oils to the action of heat and agitation with the addition of water, to eliminate acetic acid, and oils, and distilling the watery liquor, separating the oils from the distillate and treating the watery acid liquor freed from oils, for the recovery of acetic acid.

2. In a process for separating the products of the destructive distillation of wood, the sub-process which consists in subjecting the residual tar and oils to the action of steam under pressure injected into the material below the surface thereof, to eliminate oils, and acetic acid therefrom, the acetic acid being taken up by the water of condensation, distilling the watery liquor, and collecting the distillate, separating the oils from the distillate, and treating the acid liquor freed from oils for the recovery of acetic acid.

3. In a process for separating the products of the destructive distillation of wood, the sub-process which consists in subjecting the residual tar and oils to the action of live steam under pressure introduced below the surface thereof to extract the acetic acid, and oil remaining therein, distilling the watery liquor so produced, and collecting the distillate, settling the distillate for a considerable period, to effect a substantially complete separation of the oils therefrom, distilling the acetic liquor to free it from coloring and foreign matter, mixing the distillate with lime, distilling the mixture and evaporating the resulting liquor to recover gray acetate of lime.

4. In a process for separating the products of the destructive distillation of wood, subjecting the residual tar and oils obtained from the usual process for the separation of wood alcohol and acetic acid, to the action of heat and agitation with the addition of water to recover additional quantities of acetic acid and oils, distilling the watery liquor and collecting the distillate, separating the oils from the distillate, adding the distillate to the products obtained from the destructive distillation of wood, and treating the resulting material for the production of wood alcohol and acetic acid in the form of acetate of lime, whereby additional quantities of acetate of lime are recovered.

5. In a process for the separation of the products of the destructive distillation of wood, subjecting the tarry residue, after the distillation of the pyroligneous acid liquor, to the action of heat and agitation with the addition of water, to recover additional quantities of acetic acid and oils, distilling the watery liquor and collecting the distillate, separating the oils from the distillate, introducing the distillate, freed from oils, into the product from the destructive distillation of wood, subjecting the tarry residue, obtained from the first distillation of the raw tars separated from the pyroligneous acid liquor prior to the distillation of said liquor, to the action of heat and agitation with the addition of water and distilling the watery liquor, collecting the distillate, separating the oils therefrom and adding the distillate freed from oils, to the product from the destructive distillation of wood, and treating the products from the destructive distillation of wood, so augmented, for the recovery of wood alcohol and acetic acid in the form of acetate of lime, whereby additional quantities of acetate of lime are secured.

In testimony whereof we affix our signatures, in the presence of two witnesses.

THOMAS H. KENNEDY.
FRED J. HECKEL.

Witnesses:
V. L. PORTER,
C. L. FAUST, Jr.